United States Patent [19]
Cooke

[11] Patent Number: 5,969,498
[45] Date of Patent: Oct. 19, 1999

[54] INDUCTION MOTOR CONTROLLER

[75] Inventor: Philip Cooke, Nashua, N.H.

[73] Assignee: Unitrode Corporation, Merrimack, N.H.

[21] Appl. No.: 08/971,874

[22] Filed: Nov. 19, 1997

[51] Int. Cl.[6] .................................................. H02P 7/42
[52] U.S. Cl. ........................ 318/799; 318/807; 318/811
[58] Field of Search ................................ 318/798–803, 318/807, 810, 811

[56] References Cited

U.S. PATENT DOCUMENTS

| | | | |
|---|---|---|---|
| 4,215,304 | 7/1980 | D'Atre et al. | 318/758 |
| 4,366,427 | 12/1982 | Walker et al. | 318/798 |
| 4,602,201 | 7/1986 | Edwards | 318/811 |
| 4,677,360 | 6/1987 | Garces | 318/803 |
| 4,683,412 | 7/1987 | Bialek et al. | 318/798 |
| 4,767,976 | 8/1988 | Mutoh et al. | 318/808 |
| 4,967,135 | 10/1990 | Ashikaga et al. | 318/808 |
| 4,982,816 | 1/1991 | Doi et al. | 318/803 X |
| 5,483,140 | 1/1996 | Hess et al. | 318/802 |
| 5,541,488 | 7/1996 | Bansal et al. | 318/801 |
| 5,598,081 | 1/1997 | Okamura et al. | 318/801 |
| 5,754,026 | 5/1998 | Hampo et al. | 318/802 |
| 5,811,956 | 9/1998 | Yamamoto | 318/801 |
| 5,821,727 | 10/1998 | Yura | 318/809 |

*Primary Examiner*—Bentsu Ro
*Attorney, Agent, or Firm*—Weingarten, Schurgin, Gagnebin & Hayes LLP

[57] ABSTRACT

A controller for variable speed three-phase AC squirrel-cage induction motors in accordance with a volts-per-hertz control method is disclosed. Direct current ("DC") link current is employed to compensate for rotor slip. In particular, rotor slip is estimated and added to a speed reference command to compensate for changing loads. A direction input and speed reference command provide complete control over the induction motor.

23 Claims, 5 Drawing Sheets

5,969,498

INDUCTION MOTOR CONTROLLER

CROSS REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention is generally related to motor controllers, and more particularly to an open-loop speed controller integrated circuit ("IC") for alternating current ("AC") induction motors.

One advantage of induction motors as compared to permanent magnet synchronous motors is the ability to change air gap flux. This allows greater than base speed operation by reducing the flux to operate in a constant power region. However, motor current must be adjusted to match motor load in order to achieve efficient operation.

One known technique for matching motor current to motor load is vector control. Vector control employs secondary flux rotational speed and a torque command signal to control stator current frequency and amplitude. However, vector control requires a speed sensor to be placed near to the motor in order to sense motor rotation frequency, and such a speed sensor increases controller cost and may be more susceptible to electromagnetic interference.

U.S. Pat. No. 4,967,135 issued to Ashikaga et al describes a sensorless induction motor vector controller in which a vector controlled flux calculator is employed to estimate rotor speed from motor phase currents and d and q axis flux and torque commands. The sensorless controller estimates the rotor speed by other than measurement means. However, this controller is relatively complicated to implement and may be costly to produce.

BRIEF SUMMARY OF THE INVENTION

In accordance with the present invention a controller for a variable speed three-phase alternating current ("AC") induction motor operates in response to a speed reference command and includes a circuit that employs the link current to adjust operation for rotor slip using a slip estimator circuit. The slip estimator circuit estimates rotor slip and combines this estimated value with the speed reference command to compensate for different loads, thereby allowing more accurate open loop speed tracking of the reference command without an external speed sensor or complex circuitry. A direction command and the speed reference command provide control for a variable speed AC induction motor drive system that includes the controller. Further, the resultant controller can be implemented in a cost effective manner on a single integrated circuit chip.

The disclosed controller advantageously provides energy savings. Full synchronous speed is not required for all induction motor applications. Where full synchronous speed is not required, energy savings can be realized by employing an analog voltage command as a speed control. For such applications, reducing speed by ½ reduces energy consumption by ⅛, since power is proportional to angular velocity cubed. Consequently, the disclosed controller is particularly suited to variable speed loads, such as fan loads for heating, ventilating and air conditioning ("HVAC") systems, and pump systems, where quick dynamic torque response is not required but accurate steady state speed control is desirable. For these applications the slip estimator provides sufficient accuracy during steady-state conditions with minimal complexity.

BRIEF DESCRIPTION OF THE DRAWINGS

The invention will be more fully understood in view of the following Detailed Description of the Invention, in conjunction with the Drawing, of which.

DETAILED DESCRIPTION OF THE INVENTION

Figure 1:
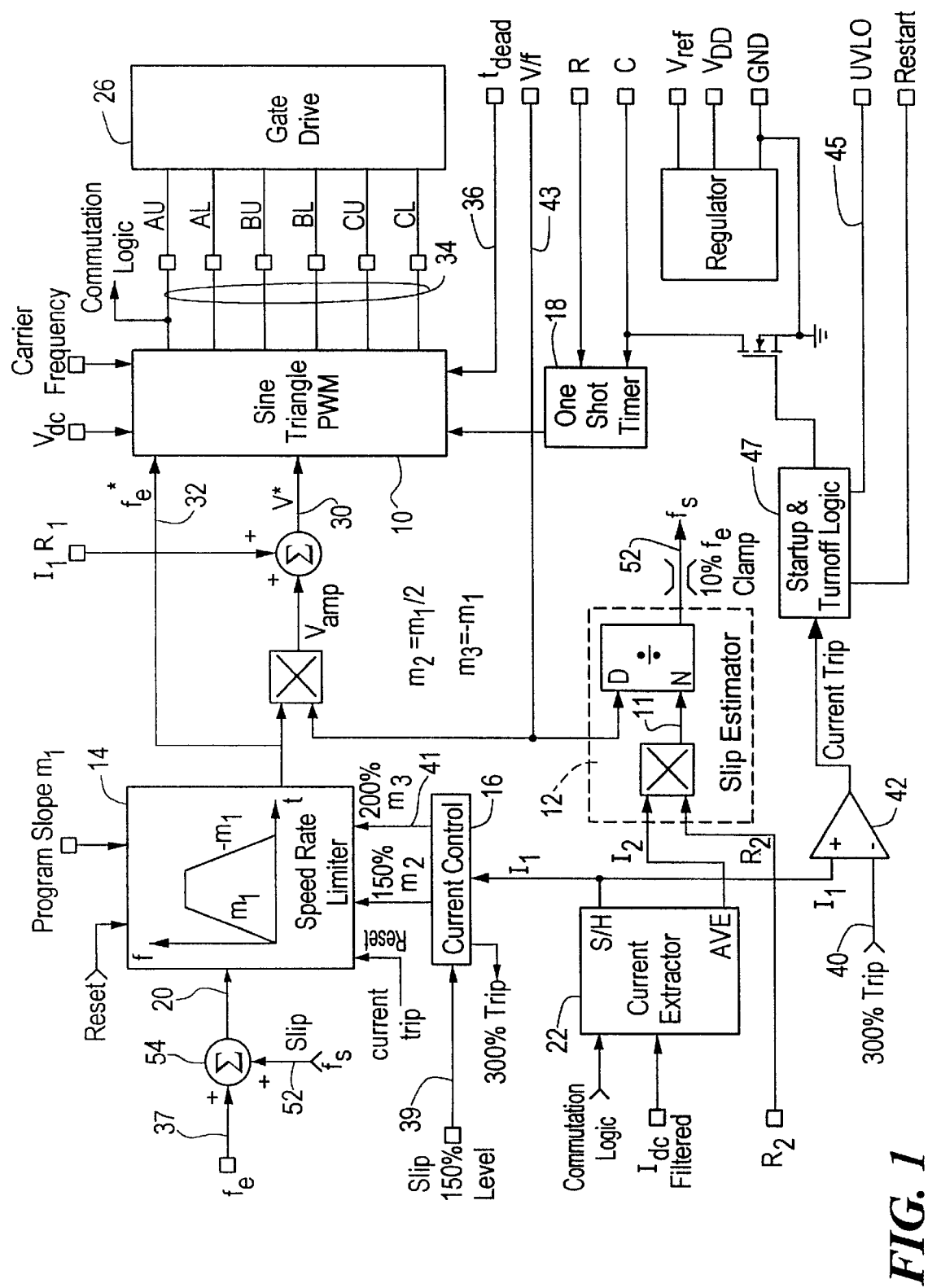
FIG. 1 is a block diagram of an induction motor controller.

Referring to FIG. 1, an AC induction motor controller includes a pulse width modulator 10, a slip estimator 12, a speed rate limiter 14, a current control 16, and a one-shot timer 18. DC link current ($I_{dc}$), DC link voltage ($V_{dc}$) and an open loop speed command 37 are provided as inputs, where "DC link" refers to a sum including each stator phase in the motor.

Figure 9:
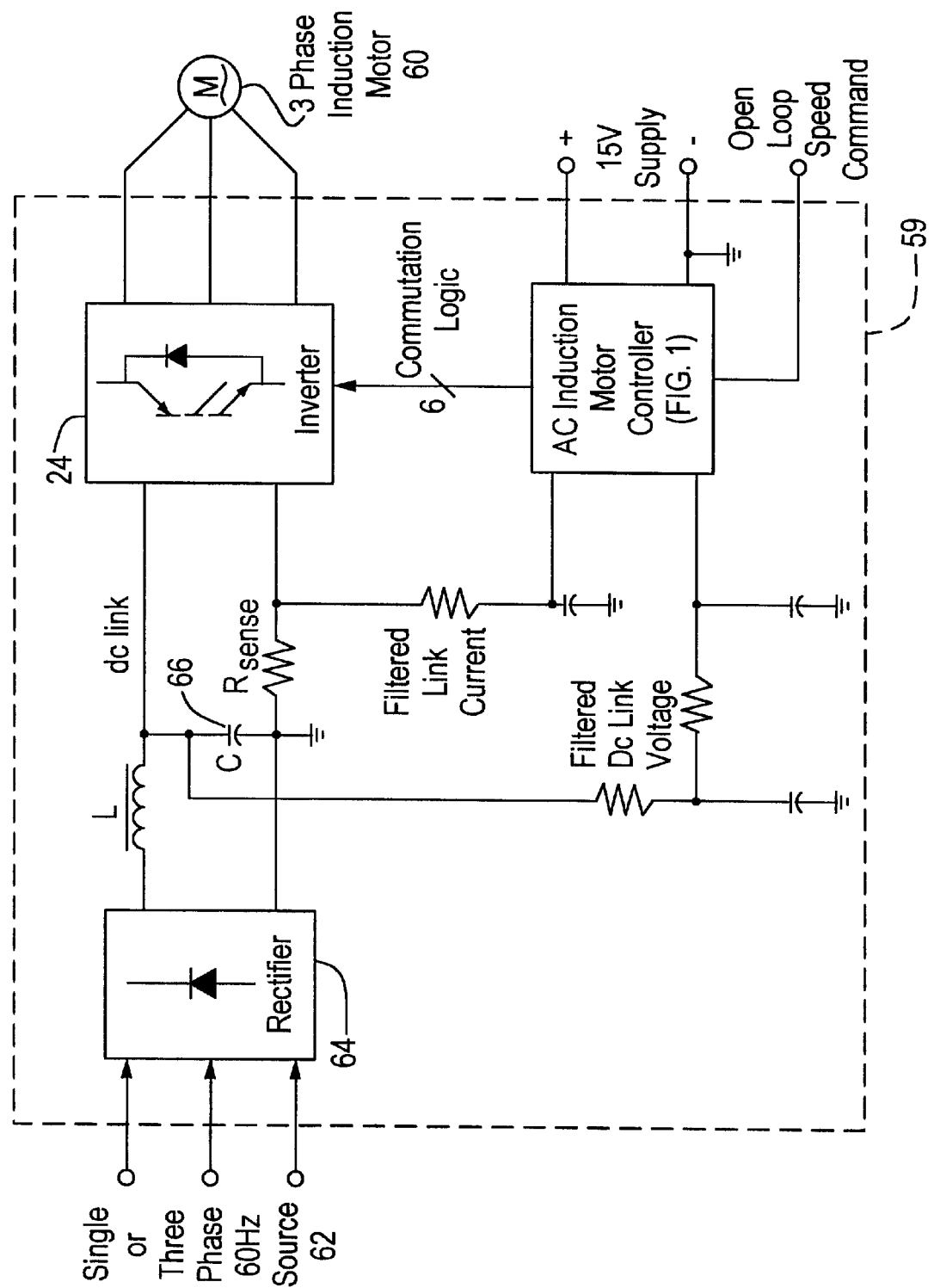
FIG. 9 is a block diagram of a variable speed drive system that employs the controller of FIG. 1.

Voltage amplitude 30 and frequency 32 input signals are provided to the pulse width modulator. The pulse width modulator output is six logic level gate signals 34 that interface to a driver-transmitter pair comprising a gate drive 26, such as parts UC3725/26/27 manufactured by Unitrode, which drive either MOSFETs or IGBTs in a voltage source inverter 24 (FIG. 9). A pulse width modulator voltage waveform applied to the motor results in almost sinusoidal motor currents due to the inductive load.

Motor speed is controlled by the analog input voltage speed reference command 37, which is proportional to the desired speed. The full scale command value corresponds to the maximum speed of the motor (often twice base speed, $\omega_b$).

Figure 2:
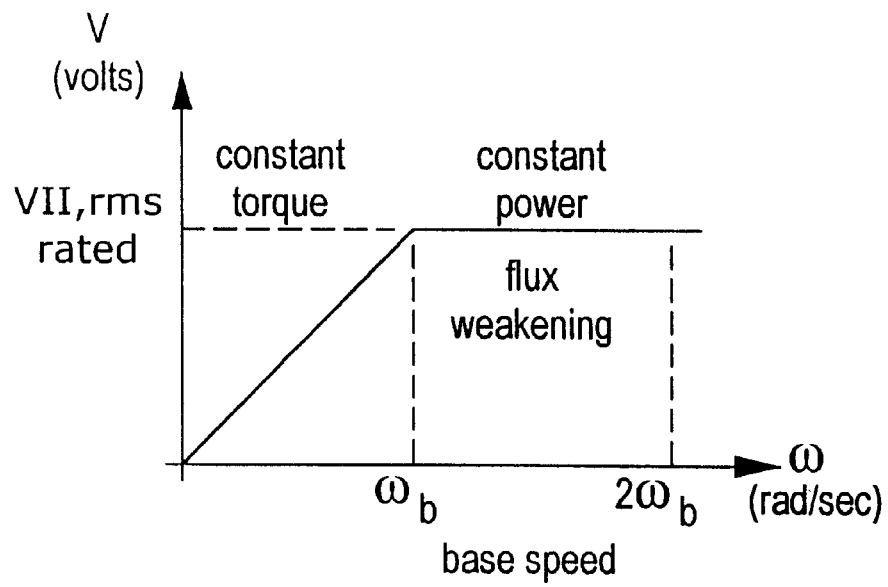
FIG. 2 is a graph of line to line fundamental stator voltage vs. ω (motor angular velocity) for constant volts per hertz control.

Control is in accordance with the constant volts-per-hertz method up to rated speed and flux weakening for up to two times or more base speed ($\omega_b$), as shown in FIG. 2.

Again referring to FIG. 1, the pulse width modulator 10 is a three phase asynchronous sine-triangle oscillator with shut down and programmable dead time features. Sine-triangle or sinusoidal pulse width modulation approximates a sine wave by comparing a triangle waveform to a reference sine wave using natural sampling. Comparator switch transition logic 34 is used in the current extractor 22 to determine sequencing of a sample and hold filter which extracts the rms stator and rotor current magnitudes $I_1$ and I2. Asynchronous modulation may be used without adding an excessively rich harmonic content to the motor if the ratio of the triangle frequency to reference frequency, i.e, the frequency modulation ratio ("$m_f$"), is high (greater than 21).

Modulation is synchronous if $m_f$ is an integer; otherwise modulation is asynchronous. If $m_f$ is an odd integer then the output voltage does not have any even harmonics in its spectrum. For three phase systems, making $m_f$ an integer multiple of three results in an output that does not contain the carrier or its harmonics. Synchronous operation is maintained in accordance with Eq. 1.

$$f_c = (6 \cdot n + 3) \cdot f_r, n = 1, 2, 3, \ldots, \quad \text{Eq. 1}$$

In Eq. 1, $f_c$ is the carrier frequency (the triangle) and $f_r$ is the generated reference frequency. The controller uses a constant $f_c$ for asynchronous operation. The choice of $f_c$ affects the number and amplitude of subharmonics produced by asynchronous modulation, however by selecting $f_c >> f_r$ these harmonics are reduced significantly.

The amplitude of the triangle can be made proportional to the DC link voltage that supplies the inverter. This voltage feed-forward capability improves the performance of the system by ensuring that the volts-per-hertz ratio is maintained even when the DC link voltage fluctuates. The reference sine wave is sampled with the triangle waveform to produce the commutation signals for the three phase full bridge inverter. The reference is composed of the fundamental, a third harmonic with relative amplitude of 0.2348, and a ninth harmonic with relative amplitude of −0.025. This harmonic injection technique effectively increases inverter output voltage amplitude and thus the speed for a given DC link voltage, which reduces total system cost. It is possible to not use the higher harmonics with a higher DC link voltage.

Figure 3:
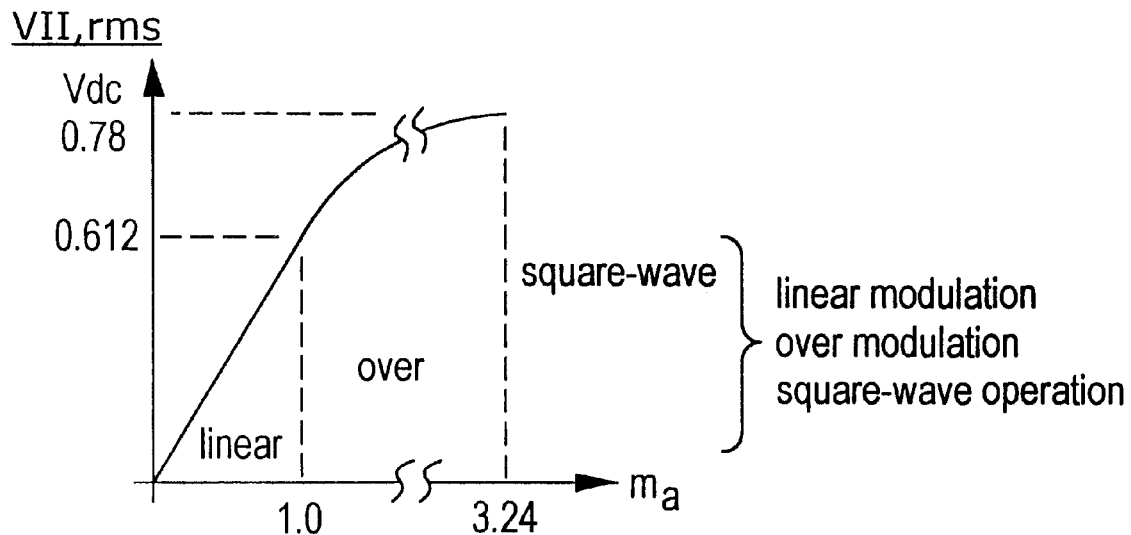
FIG. 3 is a graph of line-to-line fundamental stator voltage normalized to DC link voltage ($V_{dc}$) vs. amplitude modulation ratio.

Referring to FIG. 3, possible operation ranges are linear modulation, overmodulation, and square wave operation. Linear modulation occurs when the peak amplitude of the reference sine wave is less than the peak amplitude of the triangle wave. The ratio of the reference peak amplitude to the triangle peak amplitude is referred to as the amplitude modulation ratio ("$m_a$"). Overmodulation occurs when the triangle peak exceeds the reference peak. Square wave operation begins at approximately $m_a = 3.24$. Pulse dropping may be employed during the transition from linear modulation to square wave in order to limit the minimum pulse width. Pulse dropping is done to reduce high switching losses compressed in a short duration and to allow for snubber relaxation. This is sometimes necessary in higher power applications where GTOs are used and minimum on-times are observed, however, it may not be needed if MOSFETs or IGBTs are employed. A common size induction motor rating is 460 V rms line-to-line. For square wave operation this requires the maximum DC link voltage as represented in Eq. 2.

$$Vdc = \frac{\pi}{\sqrt{6}} \cdot Vll, \text{rms} = 590 \approx 600V. \quad \text{Eq. 2}$$

Where Vdc is the DC link voltage and Vll, rms is the line-to-line stator voltage. The fundamental voltage amplitude in the linear modulation region is given by $m_a \cdot Vdc/2$.

During overmodulation, higher harmonics are present but the higher motor speeds offset this by providing better cooling. A dead time input 36 prevents shoot-through, also known as cross-conduction, in a given inverter leg and is programmable from 50 ns to 5000 ns. Excessive dead time can cause waveform distortion and a voltage drop at low frequencies. Additionally, possible instability at medium frequencies is to be avoided. Hence, the product, $T_d \cdot f_c$, where $T_d$ is the dead time, is held as small as possible to keep the unstable region small. Phases b and c can be swapped to allow for direction control. Direction is only changed while at zero or low speeds to prevent the motor from becoming plugged leading to over current faults.

Triangle frequency is constant and may be set between 8 Khz to 22 Khz. This allows operation below 9 Khz where regulations on electromagnetic interference are less stringent. The human ear range is often responsive from 500 Hz to 10 Khz, with maximum sensitivity from 1 to 2 kHz. Therefore, some applications will require operation at 10 kHz or above to reduce objectionable noise. However, higher frequencies increase switching losses. The range of 8 kHz to 22 kHz are practical but operation above and below these frequencies are feasible.

Figure 4:
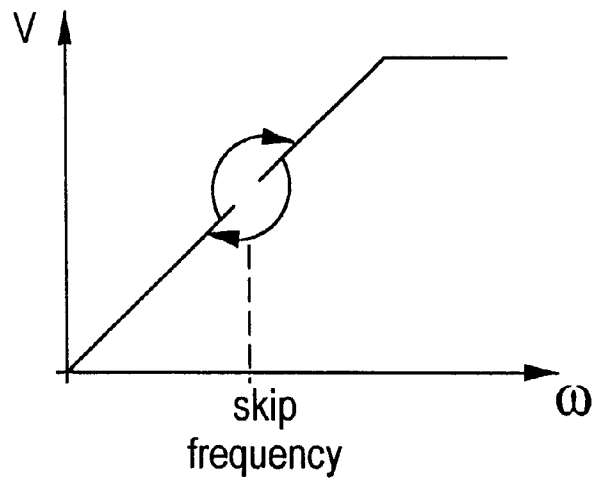
FIG. 4 is a graph that illustrates skip frequency.

The speed rate limiter circuit 14 is an acceleration control that operates on the rate of rise and fall of the speed reference command 37. The speed rate limiter is externally programmable to ramp speed up or down such that the pull-out torque of the motor is not exceeded. The speed rate limiter also provides a reduction in the rate $(d\omega/dt)$ when a 150% current level is reached, as applied to program rate limit input 39. A frequency skip function may be applied to avoid running at a rotor speed that causes resonant mechanical amplification for a given application. This can have a small hysteresis band about its center point so that hunting is prevented during acceleration or deceleration. The band may be limited to avoid excessive motor currents causing a current limit trip, as shown in FIG. 4. The speed rate limiter 14 is also employed to prevent a stall condition that would stress the inverter switches by producing excessive currents.

The program rate limit 39 reduces the speed rate limiter slope upon activation. The user can externally program the speed rate for acceleration and deceleration. This nominal value is reduced by a factor of about ½ whenever the measured current is 150% per unit of the nominal motor current. This allows the motor speed to increase or decrease more slowly under the given load and inertia. The speed reference command 37 is still followed for either acceleration or deceleration when the program rate limit is activated, but at ½ of the initial speed rate.

The current limit 41 operates to decrease the speed reference by employing negative slope upon activation. If the program rate limit 39 does not operate fast enough to reduce speed, a 200% per unit current level or higher will activate a decrease in the speed reference toward zero speed until the measured current falls below 200%. The rate of decrease is ½ of the program rate limit.

The current trip 40 operates to cause startup/turnoff logic 47 to latch-off the controller and/or delay restart upon activation at 300% per unit current or higher. In particular, the one shot timer 18 can be configured either for a delayed restart or to latch the circuit off until power is recycled. The current trip level also uses the DC link current ($I_{dc}$) as input to a comparator 42 with current trip input 40 to minimize filtering delays.

If conditions exist where the frequency of the controller becomes unlocked from the speed of the motor, the above-described current protection levels are intended to improve system performance. For example, such protection could prevent failure of the inverter circuit 24 (FIG. 9) during a locked rotor condition. Proper operation assumes that the speed rate limiter 14 is programmed correctly based on motor torque, load inertia, and load torque. The user calculates the slope using the expected load torque, speed-torque curve, and the total rotational inertia of the AC motor and load for a given application, as shown in Eq. 3.

$$T_{ind} - T_{load} = J \cdot \alpha. \quad \text{Eq. 3}$$

Where $T_{ind}$ is motor induced torque, $T_{load}$ is the load torque, J is the total rotational inertia, and α is the rotational acceleration.

Figure 5:
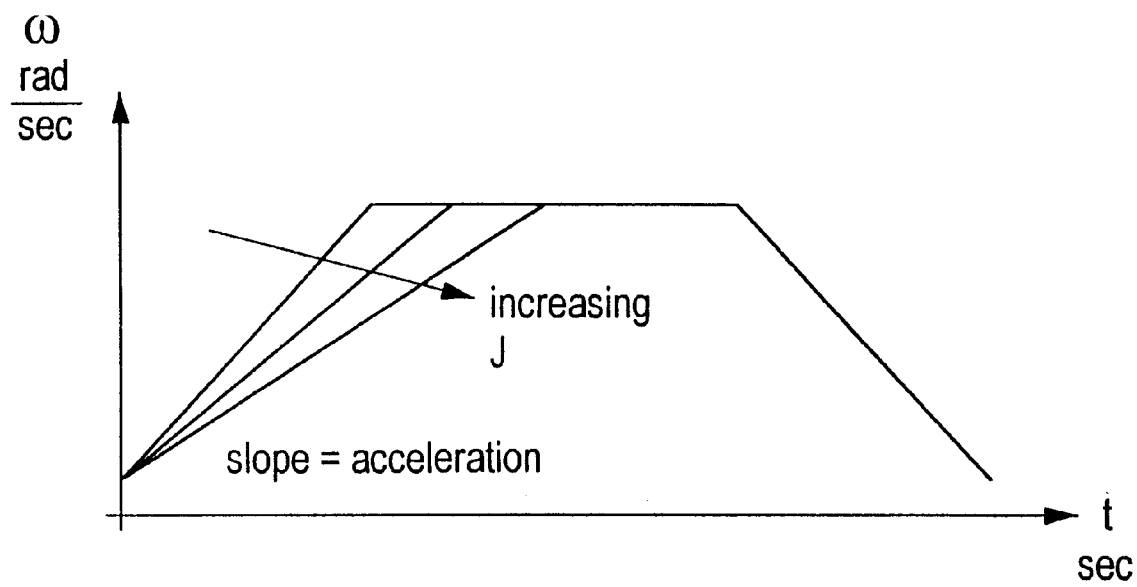
FIG. 5 is a graph that illustrates acceleration, dwell and deceleration speed.

The effect of increasing inertia is shown in FIG. 5. A start frequency can be calculated from Eq. 4, assuming 50% overcurrent is acceptable.

$$f_{start} \approx \frac{T_{start}}{T_{rated}} \cdot f_{slip,rated} \approx 1.5 \cdot f_{slip,rated} \qquad \text{Eq. 4}$$

Where $T_{start}$ is the starting torque, $T_{rated}$ is rated torque, and $f_{slip,rated}$ is the rated slip frequency.

Under voltage lockout ("UVLO") circuits 45 are employed with startup/turnoff logic 47 to guarantee that the DC link voltage is high enough to start pulse width modulation. Further, a "soft" start is provided by the speed rate limiter 14, since the controller is at minimum speed reference upon power-up.

A volt-per-hertz (V/f) ratio input 43 is employed by the slip estimator 12 to derive the frequency and amplitude from the frequency command signal 20 provided by the speed rate limiter 14, where stator resistance and rotor resistance are assumed to be constant. A sample and hold filter in 22 is employed for approximating $I_1$ and $I_2$ from $I_{dc}$ and signals from the commutation circuit. The rotor current $I_2$ is used by the slip estimator 12 to estimate the slip of the motor for low slip conditions, where s is the per unit slip, $R_2$ is the per phase rotor resistance and $V_\phi$ is the per phase rms voltage (See Eq. 9). The numerator term $I_2R_2$ ll is produced from the I2 and $R_2$ inputs and applied to the denominator term V/f 12 to produce the estimated slip signal 52. The estimated slip signal 52 is then clamped to +/−10% of $f_e$ and combined with the speed command 37 in summer 54 to provide frequency signal 20. This signal is then rate limited by 14 to produce the speed reference command 32. A voltage amplitude signal $V_{amp}$ is also produced as the product of the frequency signal 32 and the V/f input. $V_{amp}$ is combined with a low frequency boost $I_1R_1$ to provide the amplitude signal 30.

Figure 6:
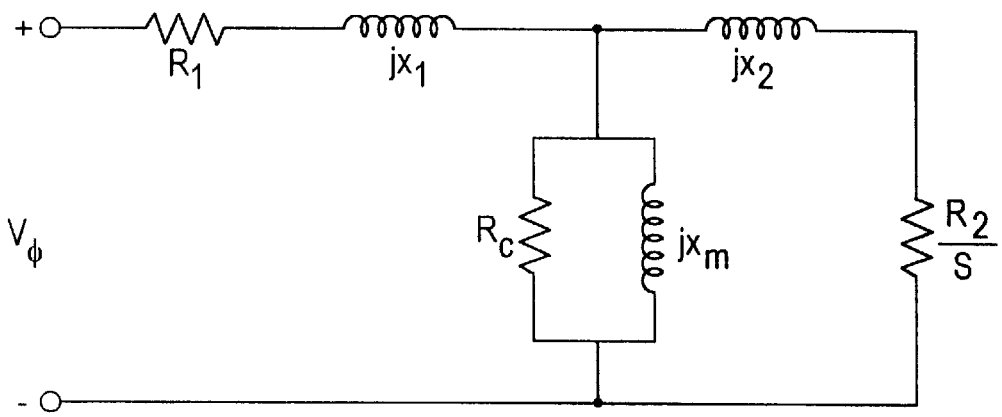
FIGS. 6–8 are schematic diagrams that illustrate slip estimation development.
Figure 7:
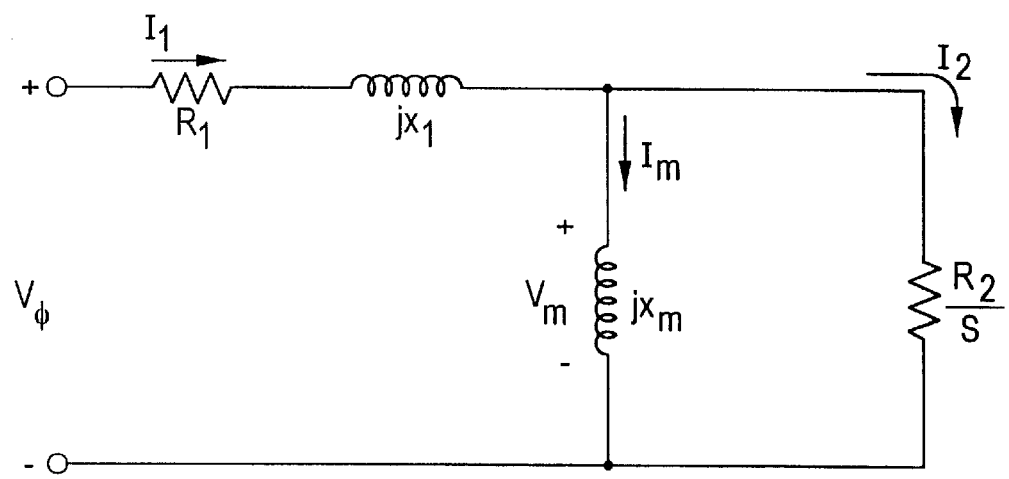
Figure 8:
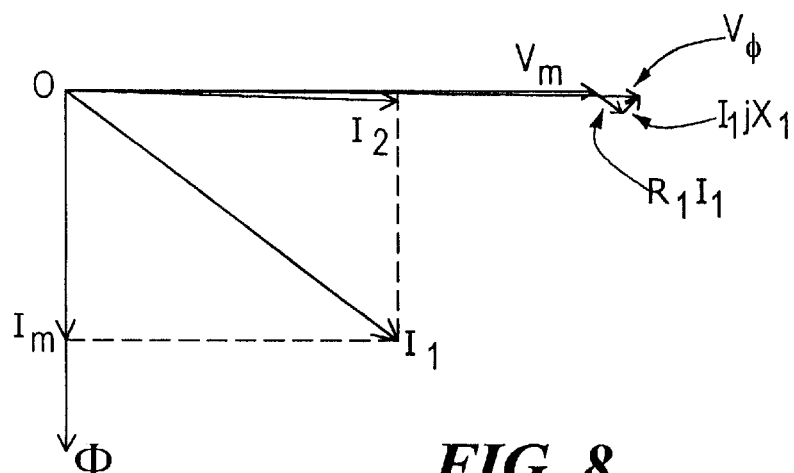

The equivalent per-phase model of the induction motor is shown in FIG. 6. Under low slip (most high efficiency induction motors) and constant air gap flux conditions the reflected rotor reactance is much smaller than $R_2$.

$$2 \cdot \pi f_r \cdot L_2 << R_2 \qquad \text{Eq. 5}$$

where $f_r$ is the rotor frequency. Neglecting core losses, i.e. $R_c$ very large, the approximate model is shown in FIG. 7. A phasor diagram can be used to show the relative positions of the stator current, $I_1$, rotor current $I_2$, and magnetizing current $I_m$ depicted in FIG. 8. From this diagram $$I_1^2 \approx I_m^2 + I_2^2 \qquad \text{Eq. 6}$$

and except for low speeds $V_m \approx V_\phi$ therefore $$V_m = I_2 \cdot R_2 / s \approx V_\phi \qquad \text{Eq. 7}$$

where s is the per unit slip and $V_m$ is the magnetizing voltage. Solving the previous equation for s yields $$s \approx I_2 \cdot R_2 / V_\phi \qquad \text{Eq. 8}$$

and finally $$\omega_{slip} \approx I_2 \cdot R_2 / (V_\phi/\omega e) \qquad \text{Eq. 9}$$

where $\omega_{slip}$ is the radian slip frequency and ωe is the electrical radian excitation frequency. Note that the $V_\phi/\omega e$ term is the volts per hertz term that is constant for a given motor and line voltage level. So a good estimate of the slip frequency can be derived from knowing the rotor current and resistance. It is the current extractor that calculates both $I_1$ and $I_2$ from a measured and filtered dc link current $I_{dc}$.

It should be noted that the programmed rotor resistance value, $R_2$, may be intentionally underestimated so that braking does not occur before rotor resistance rises due to motor temperature reaching thermal equilibrium. Further, slip estimator accuracy depends on the motor parameters and could have a first order refinement by external programming, e.g., a varying DC voltage level, as a function of motor temperature, to the $R_2$ input pin.

Referring now to FIG. 9, a variable speed drive system 59 employs the AC induction motor controller of FIG. 1 with a single or three phase source 62 to drive a three phase induction motor 60 through inverter circuit 24. The AC voltage from source 62 is operated upon by rectifier circuit 64 to provide a substantially DC output which is employed as input to the controller, and operated upon by the inverter circuit and controller to provide an AC drive signal having a desired frequency and voltage.

Three phase induction motors are typically designed to operate with a voltage variation of ±10% from nominal, or a frequency variation of ±5% from nominal. Some motors can tolerate a ±10% variation in the sum of frequency and voltage, as long as the frequency does not exceed ±5%. However, complications occur when the phases become unbalanced. When line voltages are unbalanced, an unbalance line current will flow. A small amount of voltage unbalance can lead to an excessive amount of current unbalance. The full load current unbalance can be as bad as 6 to 10 times the percentage of voltage unbalance. The following example is illustrative.

Assuming a single phase line-to-neutral unbalance of −2.6% (+2.6% leads to less current unbalance), which is 3.5 V in one phase for a 4 pole, 230 V, 1/3 hp motor, the phase unbalance is −12.5%. This corresponds to a factor of 12.5/2.6=4.8. Since rotor and stator resistances decrease as machine power rating increases, this tends to increase the amount of unbalance for larger machines. Unbalanced stator voltages also lead to negative and positive sequence rotating fields. The interaction of these fields produces torque pulsations at twice the line frequency. The effect on average torque is small if the unbalance is small, however, it would be possible to have two identical machines with one machine operating with the negative sequence and the other machine operating with the positive sequence. The total power losses ($I^2R$, core, etc . . . ) are additive but the torques subtract. The net effect is to cause the motor to work harder and run hotter with more input power under unbalanced conditions as compared to balance conditions.

An approximate relationship between temperature rise and voltage unbalance for induction motors is expressed in Eq. 9.

$$\Delta T = 2 \cdot Vunbal^2 \qquad \text{Eq. 9}$$

Hence, a motor with 2.6% voltage unbalance will have a temperature rise of 2(2.6)(2.6)=13.5%. This temperature rise will reduce the life of the motor's insulation. The sine triangle PWM 10 maintains a +/−1% voltage balance over temperature to reduce the heating effects in the motor. The sine triangle PWM is a balanced set of sine waves (120 degrees apart) with equally time delayed comparators to ensure voltage balance at 34.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. A controller for an induction motor having a rotor and a stator, the controller being operative in response to a first motor speed command signal, and comprising:

a rotor slip estimator circuit that employs link current to generate a motor rotor slip estimate, the rotor slip estimate being calculated as $I_2R_2/(V_\phi/f_e)$, where $I_2$ is rotor current, $R_2$ is per phase rotor resistance, V is per phase RMS voltage and $f_e$ is motor frequency, said rotor slip estimate being combined with the first motor speed signal to provide a second motor speed signal; and a drive circuit operative in response to the second motor speed signal to drive the induction motor.

2. The controller of claim 1 wherein link current is provided to a filter circuit to provide an estimated rotor current output.

3. The controller of claim 1 wherein link current is provided to a filter circuit to provide an estimated stator current output.

4. The controller of claim 1 wherein a frequency component of the second motor speed signal is produced by summing the first motor speed signal with the calculated rotor slip estimate.

5. The controller of claim 4 wherein a product of V/f and the frequency component of the second motor speed signal is employed to produce a voltage amplitude component of the second motor speed signal.

6. The controller of claim 1 wherein the drive circuit includes a pulse width modulator.

7. A controller for an induction motor having a rotor and a stator, the controller being operative in response to a first motor speed command signal, and comprising:

a rotor slip estimator circuit that employs link current to generate a motor rotor slip estimate, said rotor slip estimate being combined with the first motor speed signal to provide a second motor speed signal;

a drive circuit operative in response to the second motor speed signal to drive the induction motor; and a speed rate limiter circuit that prevents the rate of change of the second motor speed signal from exceeding a predetermined maximum value such that the pull-out torque of the motor is not exceeded even when the rate of change of the rotor slip estimate exceeds the predetermined maximum value.

8. The controller of claim 7 further including a first auxiliary speed rate control circuit that reduces the maximum rate of change permitted by the speed rate limiter circuit by a predetermined factor when motor current exceeds a predetermined level.

9. The controller of claim 8 wherein the first auxiliary speed rate control circuit reduces the maximum rate of change permitted by the speed rate control circuit by ½ when measured motor current exceeds nominal motor current by 1.5 per unit.

10. The controller of claim 9 further including a second auxiliary speed rate control circuit that sets a negative rate specified by the first auxiliary speed rate control circuit to decrease motor speed when current exceeds nominal motor current by 2.0 per unit.

11. The controller of claim 10 further including a third auxiliary speed rate control circuit that latches off the controller when measured motor current exceeds nominal motor current by 3.0 per unit.

12. A method for controlling an induction motor that has a rotor and a stator in response to a first motor speed signal, comprising the steps of:

employing motor link current in a rotor slip estimator circuit to generate a motor rotor slip estimate, the rotor slip estimate being calculated as $I_2R_2/(V_\phi/f_e)$, where $I_2$ is rotor current, $R_2$ is per phase rotor resistance, $V_\phi$ is per phase RMS voltage and $f_e$ is motor frequency;

combining the rotor slip estimate with the first motor speed signal to provide a second motor speed signal; and driving the induction motor with a drive circuit operative in response to the second motor speed signal.

13. The method of claim 12 including the further step of inputting link current to a filter circuit to provide an estimated rotor current output.

14. The method of claim 12 including the further step of inputting link current to a filter circuit to provide an estimated stator current output.

15. The method of claim 12 including the further step of generating a frequency component for the second motor speed signal by summing the first motor speed signal with the calculated rotor slip estimate.

16. The method of claim 15 including the further step of employing a product of V/f and the frequency component of the second motor speed signal to produce a voltage amplitude component of the second motor speed signal.

17. The method of claim 12 including the further step of pulse width modulating wherein the drive circuit includes a pulse width modulator.

18. A method for controlling an induction motor that has a rotor and a stator in response to a first motor speed signal, comprising the steps of:

employing motor link current in a rotor slip estimator circuit to generate a motor rotor slip estimate;

combining the rotor slip estimate with the first motor speed signal to provide a second motor speed signal;

driving the induction motor with a drive circuit operative in response to the second motor speed signal; and preventing the rate of change of the second motor speed signal from exceeding a predetermined maximum value such that the pull-out torque of the motor is not exceeded even when the rate of change of the rotor slip estimate exceeds the predetermined maximum value.

19. The method of claim 18 including the further step of reducing the maximum rate of change permitted by a predetermined factor when motor current exceeds a predetermined level.

20. The method of claim 19 including the further step of reducing the maximum rate of change permitted by ½ when measured motor current exceeds nominal motor current by 1.5 per unit.

21. The method of claim 20 including the further step of setting a negative rate to decrease motor speed when current exceeds nominal motor current by 2.0 per unit.

22. The method of claim 21 including the further step of latching off the drive to the motor when measured motor current exceeds nominal motor current by 3.0 per unit.

23. A controller for operating an induction motor that has a rotor and a stator, the controller being operative in response to a first motor speed signal, and comprising:

a circuit for providing link current from each stator, the link current being provided to a filter circuit to provide a rotor current output;

a rotor slip estimator circuit that employs link current to generate a motor rotor slip estimate, the rotor slip estimate being calculated as $I_2R_2/(V_\phi/f_e)$, where $I_2$ is rotor current, $R_2$ is per phase rotor resistance, $V_\phi$ is per phase RMS voltage and $f_e$ is motor frequency, where the rotor slip estimate is combined with the first motor speed signal to provide a second motor speed signal; and a drive circuit operative in response to the second motor speed signal to drive the induction motor, the drive circuit including a speed rate control circuit that controls rate of change of the second motor speed signal in a specified manner.

* * * * *

UNITED STATES PATENT AND TRADEMARK OFFICE
CERTIFICATE OF CORRECTION

PATENT NO : 5,969,498
DATED : October 19, 1999
INVENTOR(S) : Philip Cooke

It is certified that error appears in the above-identified patent and that said Letters Patent are hereby corrected as shown below:

Column 2, line 52 reads, "Control is in accordance with the constant..."
This sentence should not be an indented paragraph. It should be part of the previous paragraph.

Column 2, line 63 reads, "I2."

should read --$I_2$.--.

Column 5, line 30 reads, "I2"

should read --$I_2$--.

Column 5, line 45 (equation 5) reads, "$2 \cdot \pi fr \cdot L_2 << R_2$"

should read --$2 \cdot \pi \cdot fr \cdot L_2 << R_2$--

Signed and Sealed this

Tenth Day of April, 2001

Attest:

NICHOLAS P. GODICI

Attesting Officer    Acting Director of the United States Patent and Trademark Office